(12) United States Patent
Sloan et al.

(10) Patent No.: US 7,258,463 B2
(45) Date of Patent: Aug. 21, 2007

(54) MULTIPLE LED CONTROL APPARATUS AND METHOD

(75) Inventors: Thomas C. Sloan, Santa Barbara, CA (US); Drew Ferrie, Ojai, CA (US)

(73) Assignee: SloanLED, Inc., Ventura, CA (US)

( * ) Notice: Subject to any disclaimer, the term of this patent is extended or adjusted under 35 U.S.C. 154(b) by 0 days.

(21) Appl. No.: 10/850,299

(22) Filed: May 19, 2004

(65) Prior Publication Data

US 2005/0007035 A1    Jan. 13, 2005

Related U.S. Application Data

(60) Provisional application No. 60/471,888, filed on May 19, 2003.

(51) Int. Cl.
*F21V 9/00* (2006.01)

(52) U.S. Cl. ............... 362/231; 362/249; 362/227; 362/252

(58) Field of Classification Search ............ 362/231, 362/249, 227, 252, 800, 812; 345/204, 691, 345/692, 39, 46, 82, 83
See application file for complete search history.

(56) References Cited

U.S. PATENT DOCUMENTS

| | | | |
|---|---|---|---|
| 3,969,724 A * | 7/1976 | Anderson et al. | 712/245 |
| 4,727,540 A * | 2/1988 | Lacroix et al. | 370/522 |
| 4,962,687 A | 10/1990 | Belliveau et al. | 84/464 |
| 6,016,038 A | 1/2000 | Mueller et al. | 315/291 |
| 2002/0012008 A1 * | 1/2002 | Takagi | 345/691 |
| 2002/0149933 A1 * | 10/2002 | Archer et al. | 362/234 |

* cited by examiner

*Primary Examiner*—Sandra O'Shea
*Assistant Examiner*—Mark Tsidulko
(74) *Attorney, Agent, or Firm*—Koppel, Patrick, Heybl & Dawson

(57) ABSTRACT

One embodiment of a system for illuminating multiple LEDs has a plurality of LEDs and a controller programmed to provide a plurality of serial binary signals, each of which drives a respective one of the plurality of LEDs. Each of the serial binary signals has a series of pulses with each of said plurality of LEDs emitting light during each pulse of its respective one of the serial binary signals. The emitting intensity of each of the plurality of LEDs depends on the number of pulses in its respective one of the serial binary signals, wherein the light from the plurality of LEDs combines to emit a color of light.

35 Claims, 6 Drawing Sheets

MULTIPLE LED CONTROL APPARATUS AND METHOD

This application claims the benefit of U.S. provisional patent application No. 60/471,888 to Sloan et al., which was filed on May 19, 2003.

BACKGROUND OF THE INVENTION

1. Field of the Invention

This invention relates to a system and method for controlling the illumination of multiple LEDs.

2. Description of the Related Art

Developments in Light emitting diodes ("LEDs") have resulted in devices that are brighter, more efficient and more reliable. LEDs are now being used in many different applications that were previously the realm of incandescent bulbs; some of these include displays, automobile taillights and traffic signals. As the efficiency of LEDs improve it is expected that they will be used in most lighting applications.

Different controllers have been developed to drive multiple light sources. U.S. Pat. No. 4,962,687 to Belliveau et al. discloses a variable color lighting system which includes light fixtures controlled from a central processor unit which includes a plurality of control channels. Each light fixture includes a plurality of chromatic light sources, and the intensity of each chromatic light source is controlled in accordance with a program from the central processor over the control channels. Each light fixture is assigned a channel address and responds only to digital input packet from the central controller that have the same address. The digital input packet controls how the light fixture changes color intensities.

U.S. Pat. No. 6,016,038 to Mueller et al. discloses a system with pulse width modulated current control for an LED lighting assembly, where each current-controlled unit is uniquely addressable and capable of receiving illumination color information on a computer lighting network. The invention can include a binary tree network configuration of lighting units (nodes) and can comprise a heat dissipating housing made out of a heat-conductive material, for housing the lighting assembly. The heat dissipating housing contains two stacked circuit boards holding respectively the power module and the light module. The light module is adapted to be conveniently interchanged with other light modules having programmable current and hence maximum light intensity, ratings.

SUMMARY OF THE INVENTION

One embodiment of a system for illuminating multiple emitters comprises a plurality of emitters and a controller programmed to provide a plurality of serial binary signals, each of which drives a respective one of the plurality of emitters. Each of the serial binary signals comprises a series of pulses having substantially the same width, each of said plurality of emitters emitting light during each pulse of its respective one of the serial binary signals. The emitting intensity of each of the plurality of emitters depends on the number of pulses in its respective one of the serial binary signals.

One embodiment of a system for controlling the illumination of multiple LEDs, comprises a microprocessor for accepting a control input and generating a plurality of serial binary signals depending on the state of the input. Each of the serial binary signals comprises a series of pulses, each of which has substantially the same voltage and width. A plurality of LEDs each of which is arranged to be driven by a respective one of the serial binary signals. Each of the plurality of LEDs emitting during each pulse of its serial binary signal, with the emitting intensity of each of the LEDs dependant upon the number of pulses in its one of the serial binary signals.

Another embodiment of system for illuminating multiple emitters comprises a first plurality of emitters of one color and a second plurality of emitters of another color. A controller is included programmed to provide a plurality of serial binary signals, each of which drives a respective one of the first and second plurality of emitters. Each of the serial binary signals comprises a series of binary words having pulses. Each of the first and second plurality of emitters emitting light during each pulse of its respective one of the serial binary signals. The emitting intensity of each of the first and second plurality of emitters depending on the number of pulses in its respective one of the serial binary signals.

One method for illuminating multiple LEDs according to the present invention comprises providing at least a first and second plurality of LEDs, the first plurality of LEDs emitting a different color than the second plurality of LEDs. Driving each of the first and second plurality of LEDs with a respective serial binary signal, each of the serial binary signal having pulses of substantially the same voltage and width.

These and other features and advantages of the invention will be apparent to those skilled in the art from the following detailed description, taken together with the accompanying drawings, in which:

DETAILED DESCRIPTION OF THE INVENTION

The present invention provides an apparatus/system and method for controlling the brightness of multiple LEDs, with the light from the LEDs combining to produce many different colors and intensities of light. Although the embodiments below focus on LEDs as the emitters, it is understood that other solid state emitters can be used, such as solid state lasers. In one embodiment according to the present invention, the apparatus and method are used to control the brightness of red, green and blue (RGB) LEDs to create these and other colors of light, including white.

In one embodiment, a system is provided that is flexible enough to be arranged between standard power supplies and many different lighting products containing LEDs, including but not limited to channel letter lighting, perimeter lighting, illuminated signs, spa lighting, and other commercial and residential lighting applications. The system can accept external controls, such as by a mechanical switch, or under software/hardware control, to generate any fixed color or color modes such as color flashing or color changing.

Figure 1:
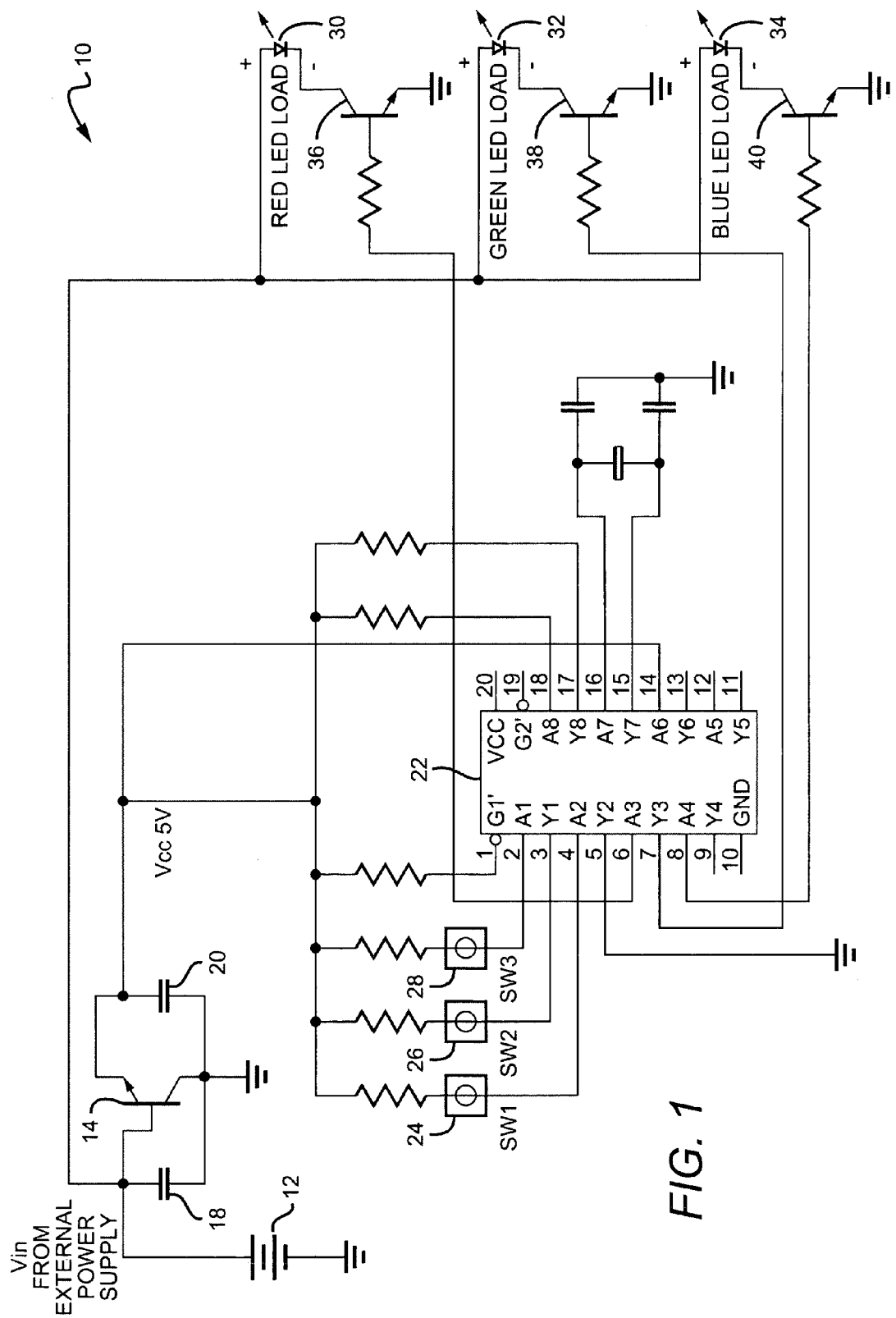
FIG. 1 is a schematic for one embodiment of a system according to the present invention for controlling multiple LEDs.

FIG. 1 shows one embodiment of a system 10 for controlling multiple LEDs, with the embodiment shown controlling red, green and blue LEDs. It is understood, however, that the system 10 can control other numbers of LEDs that can emit many different colors of light. The system 10 is powered by a standard direct current (DC) power supply 12 at voltage input ($V_{in}$) that can be many different voltages. A suitable range of supply voltages can be 5v to 30v, with a preferred voltage being approximately 12 volts. In other embodiments according to the present invention an AC voltage can be used provided the system 10 includes circuitry to rectify and filter the AC voltage before it is provided to remainder of the system.

The DC power provided at $V_{in}$ is coupled to a voltage regulator 14 that comprises known components coupled together in a known way, and are only briefly discussed herein. Voltage regulator 14 creates a 5 volt DC source that is suitable for a $V_{cc}$ power to devices such as a micro-controller 22 (described below) and many different commercially available devices can be used for voltage regulator 14. First and second capacitors 18, 20 are shunt capacitors for the voltage regulator 14 to shunt out any stray transients or oscillations that may occur.

The system 10 further comprises a micro-controller 22 that is programmed using known techniques to accept inputs, and based on the states of those inputs generate LED control signals. In system 10 the inputs are provided by first, second and third manually controlled switches 24, 26, 28. Based on the state of the switches 24, 26, 28 the micro-controller 22 generates three LED control signals. Each of the switches 24, 26, 28 is arranged such that its state determines the intensity of its respective one of the red, green and blue LEDs 30, 32, 34. In a preferred embodiment, each of the switches 24, 26, 28 has multiple states corresponding to multiple intensities for the switch's corresponding LED.

Many different devices can be used for switches 24, 26, 28, with a suitable device being a commercially available ten (10) position subminiature DIP switch for high density packaging such as a A6A-16RS DIP switch provided by Omron, Inc. Each switch 24, 26, 28 can be manually set to one of ten positions, with each position corresponding to a different LED intensity. Each switch then in turn produces a binary coded decimal (BCD) output that is coupled to an input of the micro-controller 22. Based on a BCD input received by the micro-controller 22, a LED control signal is generated corresponding to the desired intensity.

The current through each of the LEDs 30, 32, 34 is controlled using red green and blue transistors 36, 38, 40, with the collector of each transistor coupled to its respective one of the LEDs 30, 32, 34 and the emitter of each coupled to ground. The other lead of each of the LEDs 30, 32, 34 is coupled to $V_{in}$. An output of the micro-controller 22 is coupled to the base of each of the LEDs 30, 32, 34 and the micro-controller 22 sends a serial binary signal to each of the transistors 36, 38, 40. Each serial binary signal comprises a series of bit words having high pulses, with each of the pulses having substantially the same width. Many different word lengths can be used, with a suitable length being 8-bit, 16-bit, 32-bit, etc.

A high on the serial binary signal at the base of one of the transistor 36, 38, 40 turns on the transistor and creates a ground path for its respective one of the LED 30, 32, 34. This allows current to flow through the LED from V+ to ground such that the LED emits light. During a digital low on the serial binary signal, the particular one of the transistors 36, 38, 40 is not on and current does not flow through its one of the LEDs 30, 32, 34.

Figure 2:
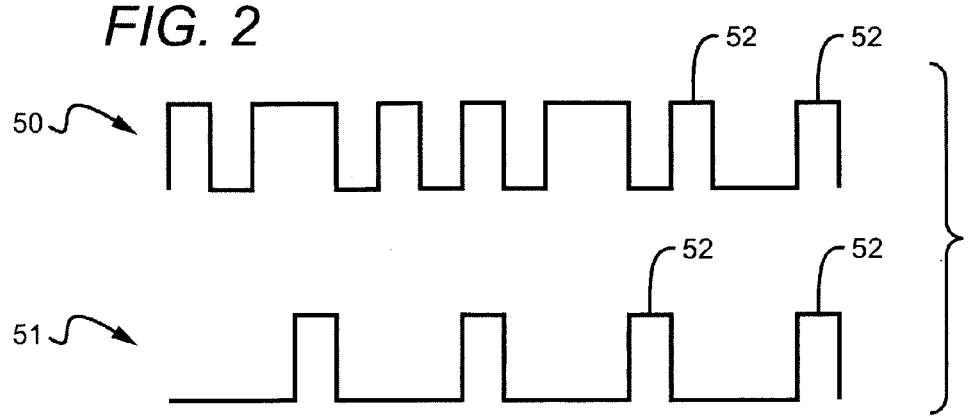
FIG. 2 is one embodiment of a serial binary waveform according to the present invention generated by the system in FIG. 1.

FIG. 2 shows two serial binary signals 50, 51 that can be generated by the microcontroller 22 according to the present invention. Each of the signals can be coupled to one of the transistors 36, 38, 40. The serial binary signals 50, 51 can be of different lengths with different pulse widths, with the signal 50, 51 being sixteen (16) bits long and each pulse having the same width. The signals 50, 51 can be one or multiple words, such as a single 16-bit word, two 8-bit words or four 4-bit words. The serial binary signals 50, 51 include a number a high pulses 52 throughout both signal cycle lengths.

During each high pulse 52 the particular one of the transistors 36, 38, 40 shown in FIG. 1 is on and current then flows through the one of the LEDs 30, 32, 34 coupled to the on transistor. For instance, if the signal 50 were coupled to red transistor 36, during each high pulse 52 transistor 36 would be on and current would flow through the red LED 30, causing it to emit light. The number of high pulses 52 in the particular signal length 50, 51 is dependant upon the intensity setting of the particular one of the switches 24, 26, 28. The higher the intensity setting, the more pulses per signal length. It is understood that serial binary streams according to the invention can take many different forms including but not limited to the high pulses having the same or different voltage levels, the time that each pulse stays high being the same or different and the pulses being uniformly or non-uniformly distributed along the word length.

The LEDs 30, 32, 34 are switched on and off by their respective serial binary signals at a high enough frequency so that the human eye cannot detect a flicker. A suitable frequency is greater than approximately 100 Hz, although other frequencies can also be used. Each serial binary signal is designed so the visual effect is to control the brightness of its respective one of the LED 30, 32, 34. The serial binary signal for each brightness level is carefully chosen to give a smooth transition from one brightness setting to the next. The serial binary signal is also designed to provide a large number of unique colors using relatively few brightness settings for each color.

The method of using a serial binary signal to control the brightness of the LEDs 30, 32, 34 has several advantages over conventional methods such as Pulse Width Modulation (PWM) or analog voltage control. The advantage of a serial binary signal over PWM is that the pulse width in the serial binary signal is fixed at all times. This allows for a series of on/off pulses to be sent at a much higher frequency for the same clock frequency. The result is that a slower clock can be used without noticing flicker for the equivalent brightness. PWM has one on pulse and one off pulse for each clock cycle. By comparison, a serial binary signal can have a string of 16 or more on/off pulses for the same clock cycle.

Another advantage is that the serial binary signal can be uniquely chosen so that the three colors are evenly blended. By using different patterns of on and off pulses unique colors can be created. PWM can achieve a similar effect, but the systems and methods according to the present invention provide for effective operation when one color is on and another color is off. The pattern sent to each color can modulate when each of the three colors are on together or off together. This can be accomplished at a frequency fast enough so the human eye cannot detect a flicker.

One of the advantages of a serial binary signal over typical analog voltage level brightness control is that the amount of product connected to the controller does not affect the performance of the product. LEDs have a fixed turn on voltage below which the LED will not emit light. If the brightness is controlled by lowering the DC voltage to the LED then it can only go so low until the LED turns off altogether. For example if a system comprises three LEDs in series and each LED has a turn on voltage of 3.5V then a total of 10.5V would be required to turn on the LEDs. Many of these three LED modules could be connected in parallel depending on the end users length requirements. Typically a 12V DC supply voltage would be used and a resistor in series with the LEDs would be used to set the current. Of the 12V supply, 1.5 volts (12-10.5) would be dropped across the resistor. The supply voltage could be changed to adjust the current and brightness of the LED. For example an 11V supply could be used to reduce the current to the LEDs. If there was loss in the wires or in the connections as more product was added then the voltage to the LEDs could drop below the 10.5V required voltage to turn the LED on. The LEDs at the end of the string may not light, where the LEDs at the beginning of the string where line loss is minimal may work fine. The result is uneven light output across the string depending on how many series circuits of 3 LEDs are connected.

Serial binary signals according to the present invention do not rely on changing the DC voltage to set the brightness of the LEDs. In a preferred embodiment the voltage sent to the LEDs is always the same, only the switched on and off at a fast frequency to create the illusion of reducing the voltage. Therefore, there is no problem with LEDs at the end of the string not turning on due to line loss effects.

Figure 3:
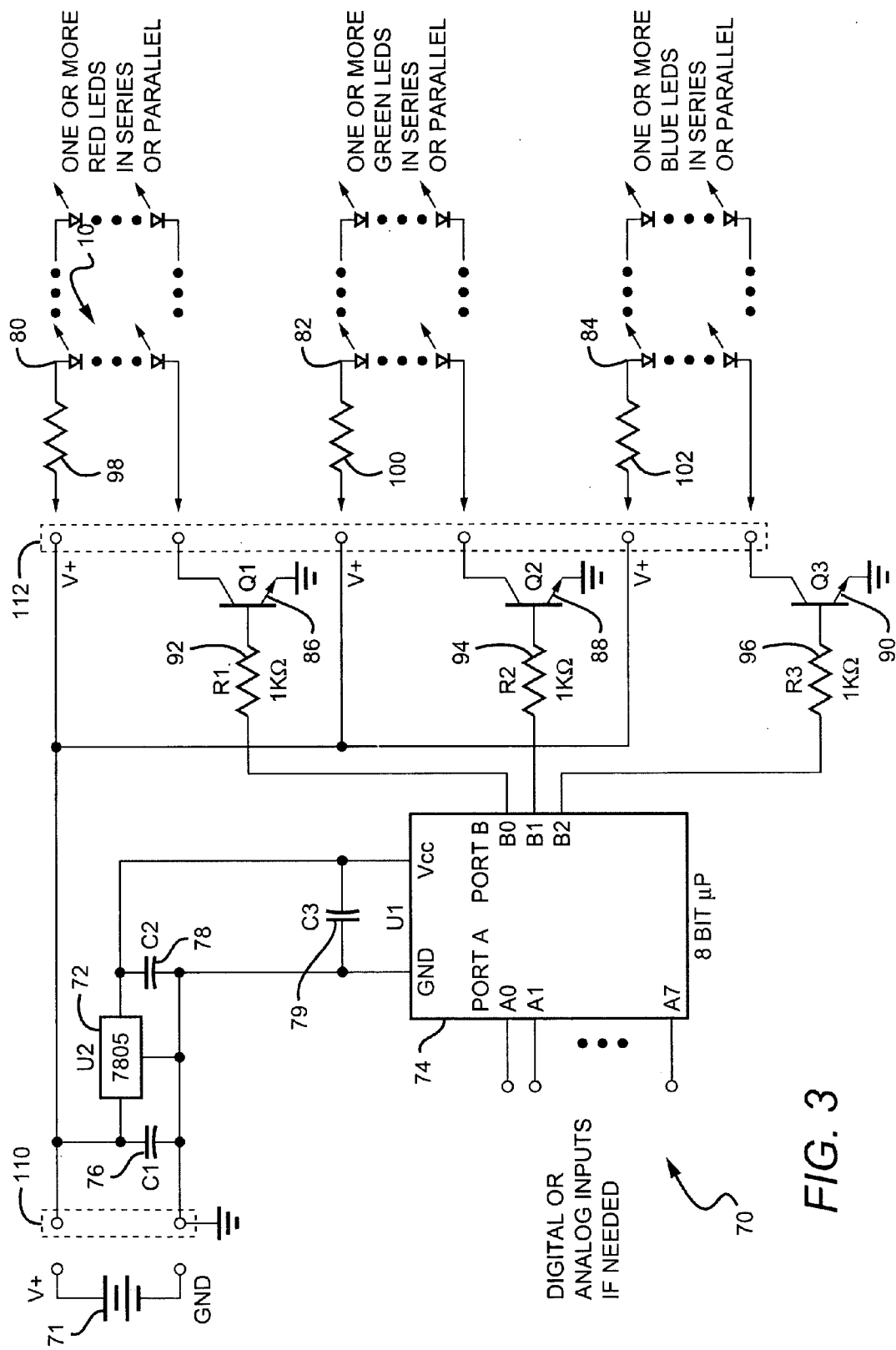
FIG. 3 is a schematic of another embodiment of a system according to the present invention for controlling multiple LEDs.

FIG. 3 shows another embodiment of a system 70 for controlling the light emission of multiple LEDs, with the LEDs in this case again being red, green and blue LEDs. It is, however, understood that the system 70 can control different numbers of LEDs of different colors. The system 70 can be powered by positive DC power supply 71 of a sufficient level to drive LEDs and to provide power to a micro-controller or micro-processor with a suitable DC voltage being 12 volts. Power from the power supply is coupled to V+. In other embodiments according to the present invention an AC voltage can be used provided the system 70 includes circuitry to rectify and filter the AC voltage before it is provided to the LEDs and microcontroller/microprocessor.

The system 70 comprises a five (5) volt positive voltage regulator 72 that accepts the DC voltage and is used to generate $V_{cc}$ that is provided to the micro-controller/microprocessor 74. Many different devices can be used for voltage regulator 72, with a suitable device being a uA78L05 provided by Texas Instrument, Inc., and Fairchild, Inc. First and second capacitors 76, 78 are shunt capacitors for the voltage regulator 72 to shunt out any stray transients or oscillations that may occur. Third capacitor 79 is a shunt capacitor for the micro-controller/microprocessor 74 between $V_{cc}$ and ground.

Different devices can be used for micro-controller/microprocessor 74 in different embodiments of the system 70 according to the present invention, with a suitable device being an eight (8) bit microprocessor such as the PIC16F819 microprocessor from Microchip Technologies, Inc. As shown in FIG. 3, port A (A0-A7) of microprocessor 74 is set up to accept inputs and port B (B0-B2) is arranged to provide output signals to cause the red, green and blue LEDs 80, 82, 84 to emit light. It is understood, however, that the ports can also be arranged in other ways according to the present invention. Inputs A0-A7 can be arranged to accept digital or analog inputs depending on the type of control device being used. In one embodiment, three of the inputs A0-A7 can be arranged to accept BCD inputs from DIP switches such as switches 24, 26, 28 shown in FIG. 1 and described above.

In other embodiments, the inputs A0-A7 can accept analog signals from manual dimming controllers such as a potentiometer, with the wiper of each potentiometer coupled to an input. As the knob of the potentiometer is turned manually, the voltage at the particular input A0-A7 changes and the microprocessor would be programmed to set the intensity of one of the output lines B0-B2 depending on the voltage at the input A0-A7. In a preferred embodiment there are three potentiometers coupled to three of the inputs A0-A7, with each potentiometer corresponding to the signal generated at one of the outputs B0-B2. Still in other embodiments there can be fewer potentiometers than LEDs with the voltage input from one of the potentiometers controlling the intensity of more than one LED, or there can be more potentiometers than LEDs with the outputs B0-B2 based on a combination of the potentiometer inputs.

In other embodiments, one or more of the inputs A0-A7 can receive signals from a switch that can be activated to a high or low. The microprocessor 74 programmed to different lighting modes, such as different colors, color changing, flashing, etc., and the microprocessor 74 can be programmed to periodically interrogate the switch inputs to determine if one or more of the switches have been activated. If one or more has, the microprocessor it can switch lighting modes and if not, the microprocessor can remain on its current mode. The microprocessor can scroll through the different lighting modes if the switch remains activated. One application of the system 70 according to the present invention is used for spa or pool lighting, with the spa or pool provided with a lighting switch. Spa occupants can activate the switch to change lighting modes and if the switch is toggled off and on, the microprocessor can switch from one lighting mode to the next. When the desired mode is reached, the user can deactivate the switch.

Still in other embodiments, the inputs A0-A7 can be programmed to accept digital data from other sensing or control electronics such as a light sensor or communication equipment. The microprocessor can be programmed to change its outputs in response to the inputs.

Each of outputs B0-B2 drives a respective one of the red, green and blue LEDs 80, 82, 84 through a corresponding respective one of first, second and third transistors 86, 88, 90. Each of outputs B0-B2 can carry a serial binary signal that the microprocessor generates based on the inputs A0-A7. For instance, output B0 is coupled to the base of the first transistor 86 and the serial binary signal on B0 is coupled to the base of the transistor 86. The transistor's emitter is coupled to ground and its collector coupled to the red LED 80. The other lead of the red LED 80 is coupled to V+ (12v). A digital high on the serial binary signal at the base of the transistor 86 turns on the transistor 86 and creates a ground path for the LED 80 such that current flows through the LED from V+ to ground, and the LED 80 emits light. During the digital low of the serial binary signal, the transistor 86 is not on and current does not flow through LED 80. Outputs B1 and B2 work similarly with second and third transistors 88, 90 and their respective green and blue LEDs 82, 84.

Many different commercially available devices can be used for transistors 86, 88, 90 with a suitable device being a TIP31 transistor from Fairchild or ST. First, second and third resisters 92, 94, 96 serve as current limiters to the base of the first, second and third transistors 86, 88, 90 respectively.

Each of the red, green and blue LEDs 80, 82, 84 can comprise more than one LED. For instance, red LED 80 can comprise multiple red LEDs coupled in parallel, series, or a combination of both, depending on the application. First, second or third LED resistors 98, 100, 102 can also be included as current limiters for the red, green and blue LEDs 80, 82, 84, respectively.

In operation, the microprocessor 74 accepts the signals at inputs A0-A7 and generates a serial binary signal at each of the outputs B0-B2. Each of the outputs B0-B2 is applied to its respective one of the transistors 86, 88, 90 to cause its one of the LEDs 80, 82, 84 to emit light. Each of the serial binary signals has the appropriate number of high pulses so that each of the LEDs 80, 82, 84 emits at the desired intensity. If one of the LEDs 80, 82, 84 is to be off, its serial binary signal will have no pulses.

The system 70 can be arranged so that it has input and output connectors 110, 112 that allow the power supply 71 and the LEDs 80, 82, 84 to be disconnected from the remainder of the system 70. This allows the different power supplies and LED modules to be interchanged with the system 70, such that the system 70 can be used with different lighting systems.

Figure 4:
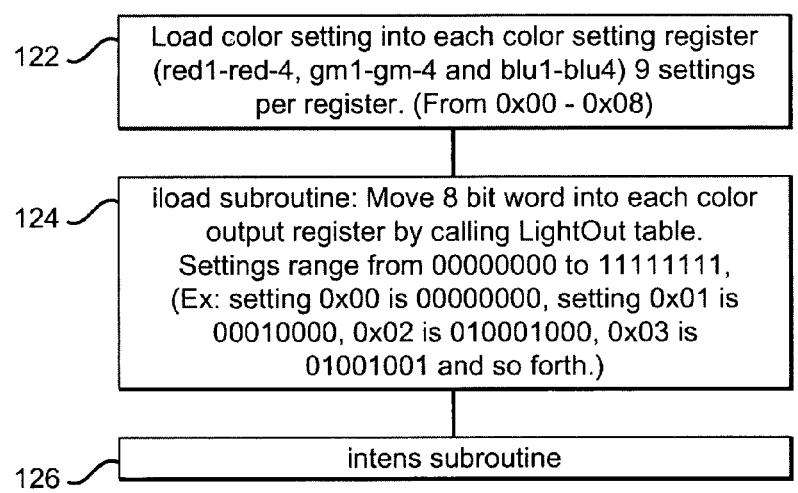
FIG. 4 is a flowchart for one embodiment of an initialization subroutine according to the present invention used in the system of FIG. 3.

The microprocessor 74 can be programmed in many different ways to drive the LEDs 80, 82, 84 with a serial binary signal according to the present invention, with the program using known software languages and loaded into microprocessor 74 using known techniques. FIG. 4 shows a flow chart for one embodiment of a program subroutine 120 according to the present invention for setting the colors in several modes of operation, such as color changing or color flash. The microprocessor 74 can output words of different length at B0-B2 with the subroutine 120 providing 32 bit words. Prior to running subroutine 120 a light output lookup table is loaded into microprocessor memory. In step 122 color settings are loaded into each color setting register, with four registers being used for each LED color (red1-red4, grn1-grn4 and blu1-blu4). There are nine available settings for each register (from 0x00 to 0x08), with each register functioning as a pointer to 8 bit word in the look up table.

In step 124 an iload subroutine is run which moves an 8 bit word from the light out lookup table into each color output register, based on the pointer in the first entry in the color setting registers. There are four color output registers for each of the red, green and blue LED colors. For example, the pointer in each of the red color setting registers (red1-red4) is used to retrieve an 8 bit word from the light out lookup table. In one embodiment, the settings in the lookup table range from 00000000 to 11111111 with a 0 ultimately being a low in the serial binary signal at one of the microprocessor outputs B0-B2 and a one ultimately being a high. A 0x00 in color setting registers could point to an eight bit word 00000000, a 0x02 to 01000100, a 0x03 to 01001001, and so forth. In step 126 the intens subroutine is run which uses the data in the color output registers to generate the serial binary signals and each of the outputs B0-B2.

Figure 5:
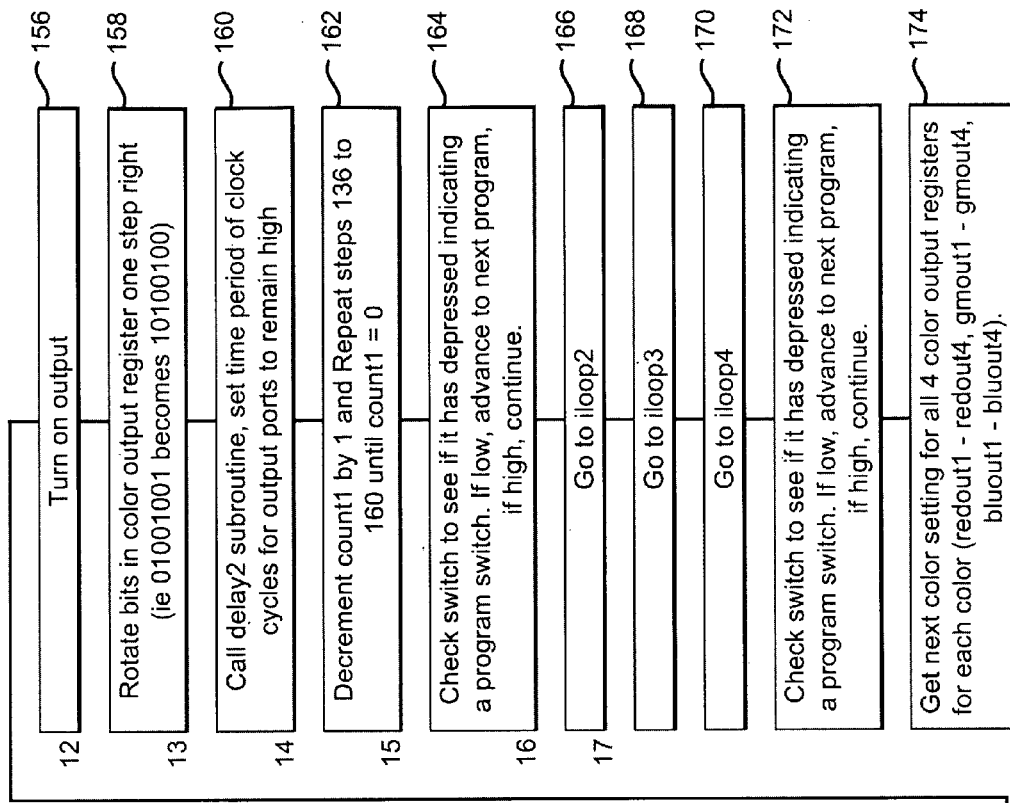
FIG. 5 is a flowchart for one embodiment of a subroutine according to the present invention for generating serial binary signals to apply to the LEDs in the system of FIG. 3.
Figure 5:
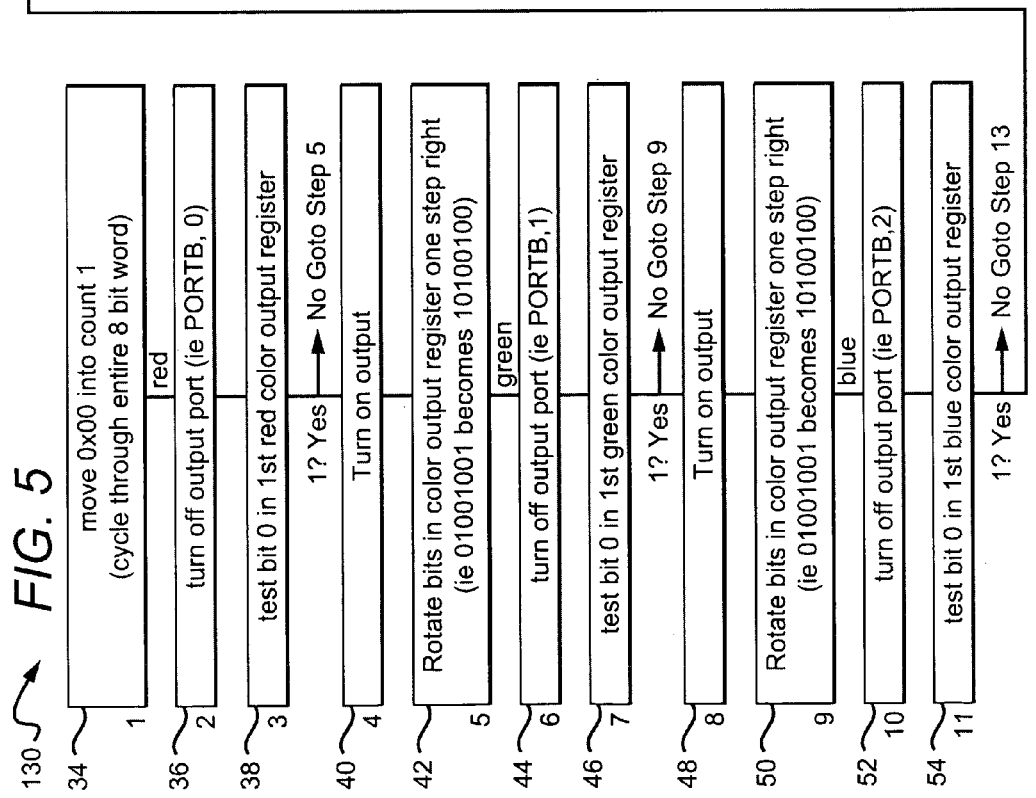

FIG. 5 shows a flowchart for one embodiment of an intens subroutine 130 according to the present invention that comprises an iloop subroutines for cycling through the first 8-bit word in each of the first red, green and blue color output registers. In step 134 a counter is initiated to 8 such that the subroutine 132 cycles through the entire 8-bit word in each of the first red, green and blue registers. In step 136 the red output B0 of the microprocessor is turned off (or low) and in step 138 the first bit (bit 0) of the first red color output register is tested. If the first bit is 1, in step 140 the output B0 is turned high, and if the first bit is not 1 then the subroutine skips to step 140, such that B0 remains off. In step 142 the red register output register is rotated one step to the right so that the next bit in the register is in position to be tested and provided at output B0.

The subroutine 130 then goes through similar steps for the green register, including the step 144 of turning off the green output port B1 and the step 146 of testing the first bit to determine if it is a 1. If it is then in step 148 output B1 is driven high, and if it is not then step 148 is skipped. At step 150 the green register is rotated one step to the right.

Subroutine 130 then goes through the similar steps for the blue register including the step 152 of turning off the blue output port B2, the step 154 of testing the first bit, the step 156 of turning on B2 if the bit is a 1, and the step 158 of rotating the register. In step 160 a call delay subroutine is run which provides a time period for how long the outputs B0-B2 remain high if any of the first bits in the red, green and blue registers are 1. In step 162 the counter is decremented by 1 and the subroutine 130 returns to step 136 and runs again through the steps that follow only now focusing on the second bit in each of the red, green and blue registers. This continues until the counter at step 162 is zero, which is an indication that all of the bits in the red, green and blue registers have been tested and output at B0-B2.

The hardware system associated with the subroutine 130 contains a manual switch at one of the inputs A0-A7 of microprocessor 74 such that when the switch is activated (input low) the software switches lighting color or mode. In step 164 the subroutine 130 checks to see if the switch has been activated and if so, the subroutine advances to the next lighting program which gives a different color or mode. If not, the subroutine 130 advances to the next step 166, which is go to iloop2.

Iloop2 contains the same steps as iloop1, but instead of utilizing the data in the first red, green and blue registers, iloop2 uses the data from the second red, green and blue registers. After iloop2 is complete, the subroutine 130 executes step 168 of going to iloop3 which uses the data from the third red, green and blue registers. Finally, after iloop3 the subroutine executes step 170 of going to iloop4 which uses the data from the fourth red, green and blue registers. After all four iloop routines have been executed the subroutine 130 executes step 172 of checking to see if the external switch is activated. If so, then the subroutine branches to the next program in memory, which could be for a different color or mode. If not, subroutine executes step 172 wherein the color settings for all four color registers are retrieved. The system then again goes through subroutine 130.

Figure 6:
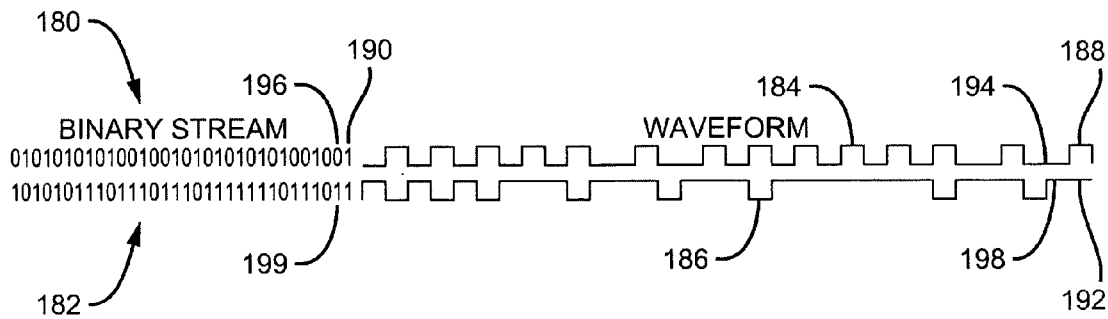
FIG. 6 is one embodiment of two serial binary waveform according to the present invention generated by the system in FIG. 3.

FIG. 6 shows two examples of data 180, 182 that could be in the four red and four blue registers and the resulting serial binary stream 184, 186 that could be output from B0 and B2 of the microprocessor. Red register data is divided into four 8-bit words with the first data word being 1001001. The subroutine 130 takes the first bit in this word and generates the appropriate output at B0, a high corresponding to the rightmost bit 190, in this case a 1. The subroutine then takes the first bit of the first green register (not shown) and generates the appropriate output at B1. The subroutine then analyzes the first blue register containing 10111011 and generate the appropriate output at B2, a high 192 in this case. The subroutine then accesses the delay to determine how long B0 and B1 should remain high. The subroutine then evaluates the second bit in each of the registers and generates the appropriate output. B0 drops to low 194 corresponding to the second bit 196 in the first red register being 0, and B2 remains high 198 corresponding to the second bit 199 in the first blue register. This continues through the remainder of the first red and blue registers and through the second, third and fourth red and blue registers.

The output at B0 and B1 is the red and blue serial binary streams that drive red and blue LEDs (or multiple LEDs). The red stream results in the red LED having an approximate 40% intensity and the blue stream results in the blue LED having an intensity of approximately 75%.

The systems 10 and 70 described above comprise relatively simple devices that can be inserted between existing power supplies and existing LED based channel letter, perimeter lighting and sign products. Two examples of these products are ChanneLED or LEDStripe products supplied by SloanLED, Inc., assignee herein. The different LED based lighting products can be connected together in a string which is then controlled by one controller. The length of the string is limited by the output of the power supply not the controller. The control module adjusts the brightness of different color LEDs to create a mixture of colors. The control module can be controlled manually by the end user to set fixed colors or can be programmed to change colors or flash.

Figure 7:
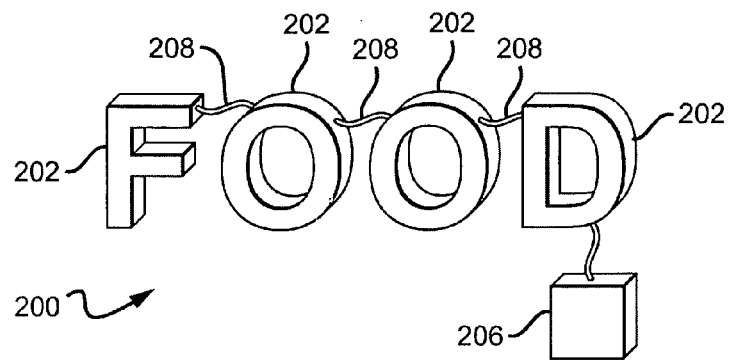
FIG. 7 is a perspective view of one embodiment of a channel letter system according to the present invention.

FIG. 7 shows one embodiment of an LED based channel letter lighting system 200 according to the present invention that comprises a plurality of channel letters 202, each of which houses a plurality of LEDs (not shown) arranged such that each of the channel letters is illuminated by its LEDs. The LEDs can emit different colors with the preferred LEDs comprising a plurality of red, green and blue LEDs whose colors can be combined so that the channel letters emit different colors and different modes of light. One or more systems 206 similar to the systems 10 and 70 shown in FIGS. 1 and 3 respectively, can be included to provide a plurality of serial binary signals to drive the LEDs within the channels. Each of the channel letters 202 can have its own system, or as shown in FIG. 7 a single system 206 can be used to drive the channel letters 202 that are connected in a daisy-chain by conductors 208 so that the serial binary signals pass from one channel letter to the next.

Figure 8:
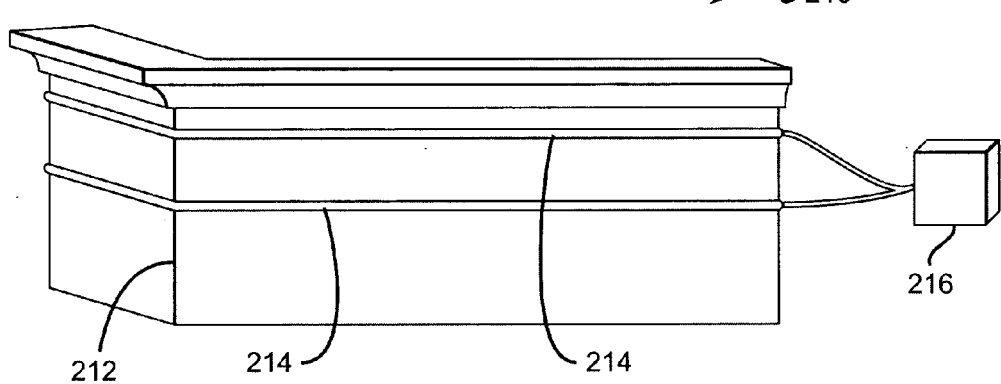
FIG. 8 is a perspective view of one embodiment of a perimeter lighting system according to the present invention.

FIG. 8 shows one embodiment of a perimeter lighting system 210 according to the present invention mounted to a structural feature 212. The lighting system 210 comprises a plurality of elongated lighting fixtures 214 that each of which have a plurality of internal LEDs (not shown). Each of the lighting fixtures 214 is connected together is a daisy-chain so that a signal applied to one fixture 214 spreads to the other fixtures 214 in the daisy-chain. When the LEDs in the light fixtures 214 emit light, they give the appearance of a continuous perimeter light along the feature 212. The plurality of LEDs within the light fixtures can comprise a plurality of red, green and blue LEDs. A system 216 similar to systems 10 and 70 can be included to provide one or more serial binary signals to drive the LEDs within the light fixtures 214.

Figure 9:
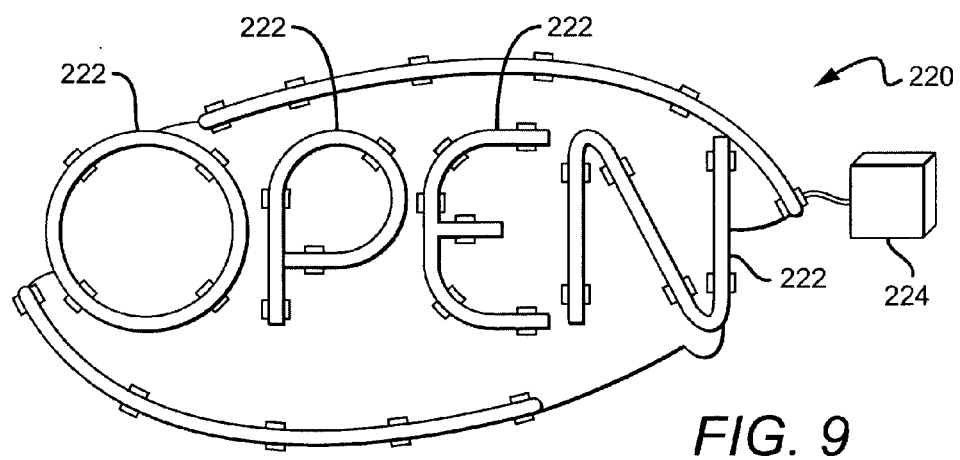
FIG. 9 is a perspective view of one embodiment of a sign system according to the present invention.

FIG. 9 shows one embodiment of an LED based sign system 220 according to the present invention comprising a plurality of bent elongated lighting fixtures 222 to form illuminated features of the sign system 220. The lighting fixtures have a plurality of internal LEDs arranged similarly to the LEDs in the perimeter lighting system 210 of FIG. 8. The lighting fixtures are similarly connected in a daisy-chain and a system 224 is included to provide serial binary signals to drive the LEDs.

Figure 10:
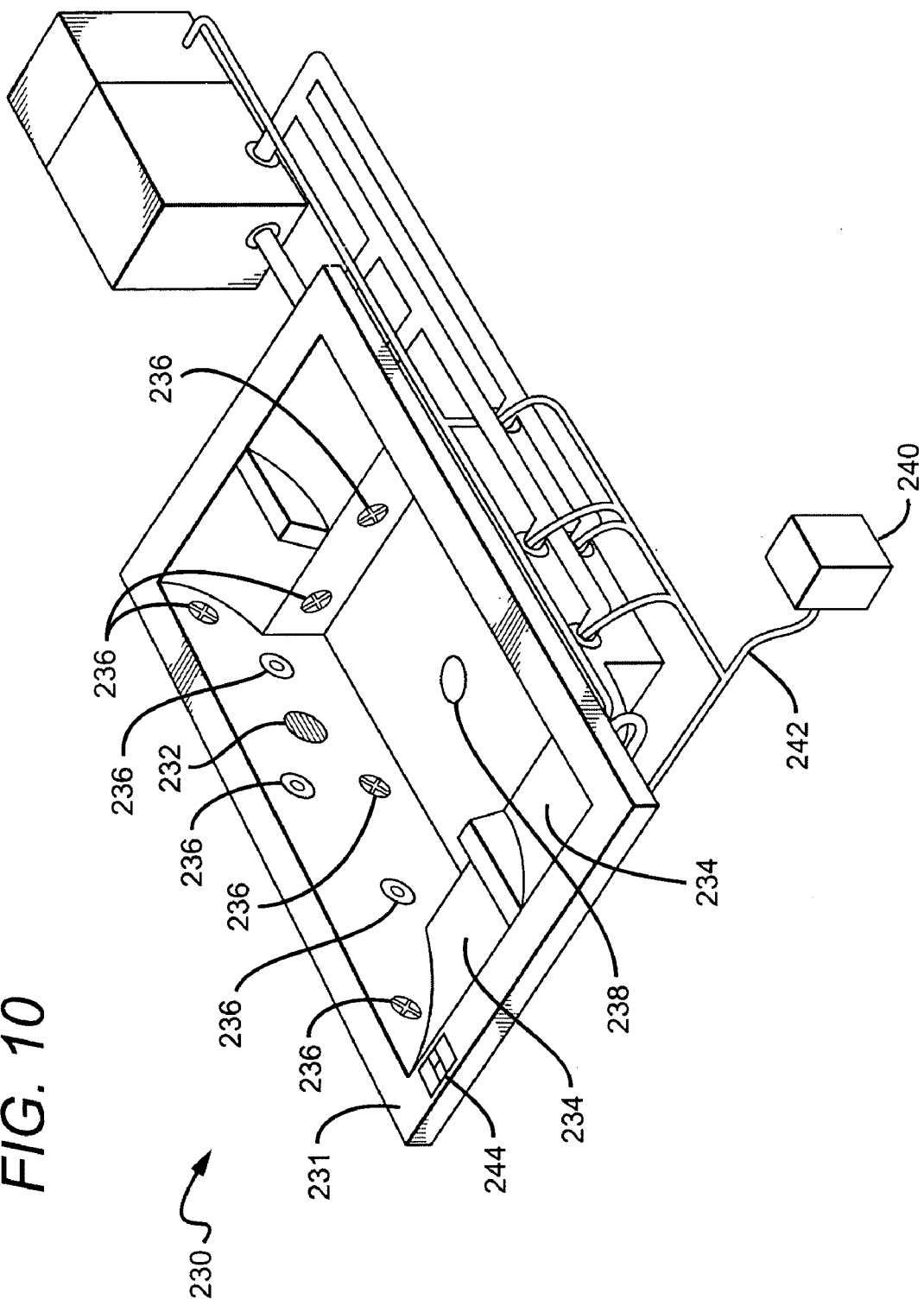
FIG. 10 is a perspective view of one embodiment of a spa system according to the present invention.

FIG. 10 shows one embodiment of a spa or pool 230 having LED based lighting system according to the present invention. The spa 230 comprises a reservoir shell 231 having various spa components passing through the spa shell 231. A plurality of red, green and blue LEDs are provided, with the desired spa components each having a respective one of said plurality of red, green and blue LEDs to illuminate the interior of said reservoir through said spa components, for instance, spa flood light 232, point lights 234, jets 236, drains 238 and/or skimmers. The spa further comprises an LED driving system 240 that controls the illumination of the plurality of red, green and blue LEDs in each by generating respective serial binary signals for each of said plurality of red, green and blue LEDs. The serial binary signals are coupled to the spa features over control lines 242. The spa can also include a manual switch 244 that allows a spa occupant to change the color of mode of color being emitted by the LEDS.

Although the present invention has been described in considerable detail with reference to certain preferred configurations, other versions are possible. Therefore, the spirit and scope of the appended claims should not be limited to the preferred versions described above.

We claim:

1. A system for illuminating multiple emitters, comprising:
   a plurality of emitters;
   a controller programmed to provide a plurality of serial binary signals, each of which drives a respective one of said plurality of emitters, wherein each of said serial binary signals comprises a series of pulses having substantially the same width, each of said plurality of emitters connected to accept said binary signals in binary form and connected to emit light during each pulse of a respective one of said serial binary signals, the emitting intensity of each of said plurality of emitters proportional to the number of pulses in a respective one of said serial binary signals.

2. The system of claim 1, wherein said plurality of emitters comprises at least two LEDs emitting different colors of light, wherein the light from said plurality of LEDs combines to emit a different color of light.

3. The system of, claim 2, wherein said plurality of LEDs comprises a red, green and blue LED.

4. The system of claim 2, further comprising a plurality of transistors, each of which is coupled to a respective one of said plurality of LEDs, a respective one of said serial binary signals coupled to one of said transistors, said transistor causing its respective one of said LEDs to emit light during each pulse of its serial binary signal.

5. The system of claim 1, wherein said plurality of emitters comprises a plurality of red LEDs, a plurality of green LEDs, and a plurality of blue LEDs.

6. The system of claim 5, wherein a respective one of said plurality of serial binary signals drives said red LEDs, green LEDs and blue LEDs.

7. The system of claim 1, wherein said controller accepts a control input to control the color or mode of light from said emitters, said controller generating different ones of said plurality of serial binary signals depending on the state of said control input.

8. The system of claim 1, wherein said controller accepts a plurality of control inputs to control the color or mode of light from said emitters, said controller generating different ones of said plurality of serial binary signals depending on the state of said control inputs.

9. The system of claim 1, wherein each of said serial binary signals comprises a series of 8-bit binary words generated by said controller.

10. The system of claim 1, wherein each said pulse is the same voltage.

11. A system for controlling the illumination of multiple LEDs, comprising:
- a microprocessor for accepting a control input and generating a plurality of serial binary signals depending on the state of said input, wherein each of said serial binary signals comprises a series of pulses, each of which has substantially the same voltage and width; and
- a plurality of LEDs each of which is arranged to be driven by a respective one of said serial binary signals, each of said plurality of LEDs connected to emit during each pulse of a respective serial binary signal, the emitting intensity of each of said LEDs proportional to the number of pulses in a respective one of said serial binary signals.

12. The system of claim 11, wherein said plurality of LEDs comprises a red, green and blue LED.

13. The system of claim 11, wherein said plurality of LEDs comprises a plurality of red LEDs, a plurality of green LEDs, and a plurality of blue LEDs and wherein a respective one of said plurality of serial binary signals drives said red LEDs, green LEDs and blue LEDs.

14. The system of claim 11, wherein said control input controls the color or mode of light from said LEDs, said microprocessor generating different ones of said plurality of serial binary signals depending on the state of said control input.

15. The system of claim 11, wherein said control input comprises a plurality of inputs to control the color or mode of light from said LEDs, said microprocessor generating different ones of said plurality of serial binary signals depending on the state of said control inputs.

16. The system of claim 11, further comprising a plurality of transistors, each of which is coupled to a respective one of said plurality of LEDs, a respective one of said serial binary signals coupled to one of said transistors, said transistor causing its respective one of said LEDs to emit light during each pulse of its serial binary signal.

17. The system of claim 11, wherein each of said serial binary signals comprises a series of 8-bit binary words generated by said controller.

18. A system for illuminating multiple emitters, comprising:
- a first plurality of emitters of one color;
- a second plurality of emitters of another color; and
- a controller programmed to provide a plurality of serial binary signals, each of which drives a respective one of said first and second plurality of emitters, wherein each of said serial binary signals comprises a series of binary words having pulses having substantially same width, each of said first and second plurality of emitters connected to emit light during each pulse of a respective one of said serial binary signals, the emitting intensity of each of said first and second plurality of emitters proportional to the number of pulses in respective one of said serial binary signals.

19. The system of claim 18, wherein each of said binary words are the same length.

20. The system of claim 18, wherein each of said pulses has substantially the same voltage.

21. The system of claim 18, wherein said first and second plurality of emitters comprises LEDs.

22. The system of claim 18, comprising a third plurality of emitters emitting a third color of light, said controller programmed to provide one of said serial binary streams to said third plurality of emitters, said first, second and third plurality of emitters emitted red, green and blue, respectively.

23. A channel letter lighting system, comprising:
- a plurality of channel letters, each of which houses a first plurality of LEDs emitting one color, and at least a second plurality of LEDs emitting another color light, the light from said first and second pluralities of light combining to illuminate each of said channel letters; and
- a controller to generate a plurality of serial binary signals, each of which drives a respective one of said first and second plurality of LEDs, each of said serial binary signals comprising pulses of substantially the same voltage and width, each of said first and second plurality of LEDs connected to emit during each pulse of said serial binary signal.

24. The lighting system of claim 23, further comprising a third plurality of LEDs, said controller generating a serial binary signal to drive said third plurality of LEDs, said first, second and third pluralities of LEDs comprising red, green and blue LEDs respectively.

25. A perimeter lighting system, comprising:
- a plurality of elongated lighting fixtures, each of which houses a first plurality of LEDs emitting one color, and at least a second plurality of LEDs emitting a different color, said lighting fixtures daisy-chained together such that an electrical signal applied to the first of said elongated lighting fixtures is transmitted to the others; and
- a controller to generate a plurality of serial binary signals, each of which drives a respective one of said first and second plurality of LEDs, each of said serial binary signals comprising pulses of substantially the same voltage and width, each of said first and second plurality of LEDs connected to emit during each pulse of said serial binary signal.

26. The lighting system of claim 25, further comprising a third plurality of LEDs, said controller generating a serial binary signal to drive said third plurality of LEDs, said first, second and third pluralities of LEDs comprising red, green and blue LEDs respectively.

27. An illuminated sign lighting system, comprising:
- a plurality of elongated lighting fixtures each of which is formed into a desired shape and each of which houses a first plurality of LEDs emitting one color, and at least a second plurality of LEDs emitting a different color, said lighting fixtures daisy-chained together such an electrical signal applied to the first of said elongated lighting fixtures is transmitted to the others; and a controller to generate a plurality of serial binary signals, each of which drives a respective one of said first and second plurality of LEDs, each of said serial binary signals comprising pulses of substantially the same voltage and width, each of said first and second plurality of LEDs connected to emit during each pulse of said serial binary signal.

28. The lighting system of claim 27, further comprising a third plurality of LEDs, said controller generating a serial binary signal to drive said third plurality of LEDs, said first, second and third pluralities of LEDs comprising red, green and blue LEDs respectively.

29. A system for illuminating a spa or pool, comprising;
a reservoir shell capable of holding water;
a plurality of spa components extending through said reservoir shell;
a first plurality of LEDs emitting one color, each of which illuminates into said reservoir shell through a respective one of said reservoir components, and at least a second plurality of LEDs emitting a different color, each of which also illuminates into said reservoir shell through a respective one of said reservoir components; and
a controller to generate a plurality of serial binary signals, each of which drives a respective one of said first and second plurality of LEDs, each of said serial binary signals comprising pulses of substantially the same voltage and width, each of said first and second plurality of LEDs connected to emit during each pulse of said serial binary signal.

30. The system of claim 29, further comprising a third plurality of LEDs, said controller generating a serial binary signal to drive said third plurality of LEDs, said first, second and third pluralities of LEDs comprising red, green and blue LEDs respectively.

31. A method for illuminating multiple LEDs, comprising:
providing at least a first and second plurality of LEDs, said first plurality of LEDs emitting a different color than said second plurality of LEDs; and
driving each of said first and second plurality of LEDs with a respective serial binary signal, each of said serial binary signals having uniform pulses of substantially the same voltage and width, each of said plurality of LEDs emitting light in response to each of said uniform pulses.

32. The method of claim 31, further comprising combining the color from said first and second plurality of LEDs to generate a third color.

33. The method of claim 31, wherein the emitting intensity of said first and second plurality of LEDs is dependant upon the number of pulses in its serial binary signal.

34. The method of claim 31, further comprising providing a third plurality of LEDs emitting still a different color of light and driving said third plurality with a serial binary signal.

35. The method of claim 34, wherein said first, second and third plurality of LEDs comprise red, green and blue emitting LEDs respectively.

* * * * *